May 24, 1960 M. L. ANTHONY 2,937,917

RECORDING DEVICE

Filed Aug. 7, 1957

INVENTOR.
MYRON L. ANTHONY
BY Thomas E. Dorn
ATT'Y.

United States Patent Office 2,937,917 Patented May 24, 1960

2,937,917

RECORDING DEVICE

Myron L. Anthony, La Grange, Ill., assignor, by mesne assignments, to Peter G. S. Mero Filed Aug. 7, 1957, Ser. No. 676,816

6 Claims. (Cl. 346—139)

This invention relates to a new and improved recording device. More particularly, the invention relates to a recording device suitable for use in an intelligence communication system of the kind in which data is manually transcribed at one station of the system and is automatically reproduced at another station and to a coupling system suitable for use in such a recording device.

In tele-autographic communication systems, a message or other data is manually transcribed upon a writing surface at one station of the system and is automatically reproduced at a second or receiver station in the system. In order to transmit the information necessary for reproduction at the receiver, the transmitter must include a suitable apparatus for analyzing movements of the transmitter stylus or other recording device and for developing electrical control signals representative of those movements. A preferred system of this kind is described in Patent No. 2,583,535 of Robert Adler, issued January 29, 1952, and in Patent No. 2,649,503 of Robert Adler, issued August 18, 1953; both of these patents are assigned to the same assignee as the present invention. The mechanical translating apparatus employed in systems of this kind is preferably made relatively light in weight, in order to minimize inertia effects in the system and to permit convenient operation thereof. Moreover, these mechanisms must be quite sensitive in operation and therefore require maximum protection from misuse on the part of the operator.

Usually, in tele-autographic and similar communication systems, it is preferred that the stations of the system comprise transceivers in order that messages may be sent in either direction through the system. Consequently, it is desirable to afford a pen or stylus actuator for each station of the system in order to provide a convenient means for manual actuation of that station as a transmitter. At the same time, this stylus actuator should be readily removable from the recording head or stylus of the unit, since it may constitute an undesirable mechanical impediment to operation of the station as a receiver.

There are certain readily definable characteristics which are highly desirable in a recording device for use in an intelligence communication system of the kind described hereinabove. The device, in addition to the usual marking stylus or other recording member, should include an actuator suitable for manual operation but detachable from the stylus. The actuator should engage the stylus in such a manner as to permit normal manual movement thereof in the transcription of the message or other data to be transmitted. The engagement between the stylus and the actuator should be such as to maintain the two in operative relationship when a certain amount of pull is exerted upon the actuator tending to separate it from the stylus. On the other hand, the actuator should be immediately freed from engagement with the stylus upon exertion of excess pull thereon in order to avoid the possibility of damage to the mechanical linkage connected to the stylus or other recording member. The coupling between the actuator and stylus should comprise a universal connection; that is, it should permit movement of the actuator to any desired angle, with respect to the stylus, which will be convenient to the operator of the transmitter station. On the other hand, the coupling should not permit lateral or transverse movement of the actuator with respect to the stylus so long as these two members are coupled together.

A primary object of the invention, therefore, is a new and improved recording device which affords the operating characteristics set forth hereinabove.

A more specific object of the invention is a new and improved recording device comprising a stylus or other recording member and an actutor for guiding the movements thereof, in which the actuator is maintained in engagement with the stylus until a predetermined force is exerted upon the actuator tending to separate it from the stylus.

Another object of the invention is a new and improved recording device comprising a stylus or other recording member and a stylus actuator which may be easily and conveniently engaged with the stylus.

Another object of the invention is a new and improved coupling system of the kind which restricts relative movement of the coupled members to rotational movement.

An additional object of the invention is a new and improved non-elastic universal-type coupling device.

A further object of the invention is a new and improved recording device, including a stylus and a removable stylus actuator, which approaches as nearly as possible the normal operating characteristics and "feel" of a conventional pen or other writing instrument.

A further object of the invention is a new and improved recording device of the kind described hereinabove which is inherently simple and economical in construction.

A recording device constructed in accordance with the invention comprises a stylus member supported for movement into and out of recording position with respect to a recording medium. An actuator member is utilized to guide the movements of the stylus. These two members are coupled by a coupling system comprising a permanent magnet mounted on one of the members; this magnet may be provided with a suitable pole piece element supported in engagement therewith. The recording device further comprises a magnetic keeper element which is mounted on the other of the stylus and actuator members. One of the two magnetic elements is provided with a convex surface; the other of these two elements has a concave contact surface. One of these surfaces is encompassed by non-magnetic material to limit the coupled elements to a given type of movement relative to each other.

Other and further objects of the present invention will be apparent from the following description and claims and are illustrated in the accompanying drawing which, by way of illustration, shows preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

Figures 1, 2, 3, 4, 5, 6:
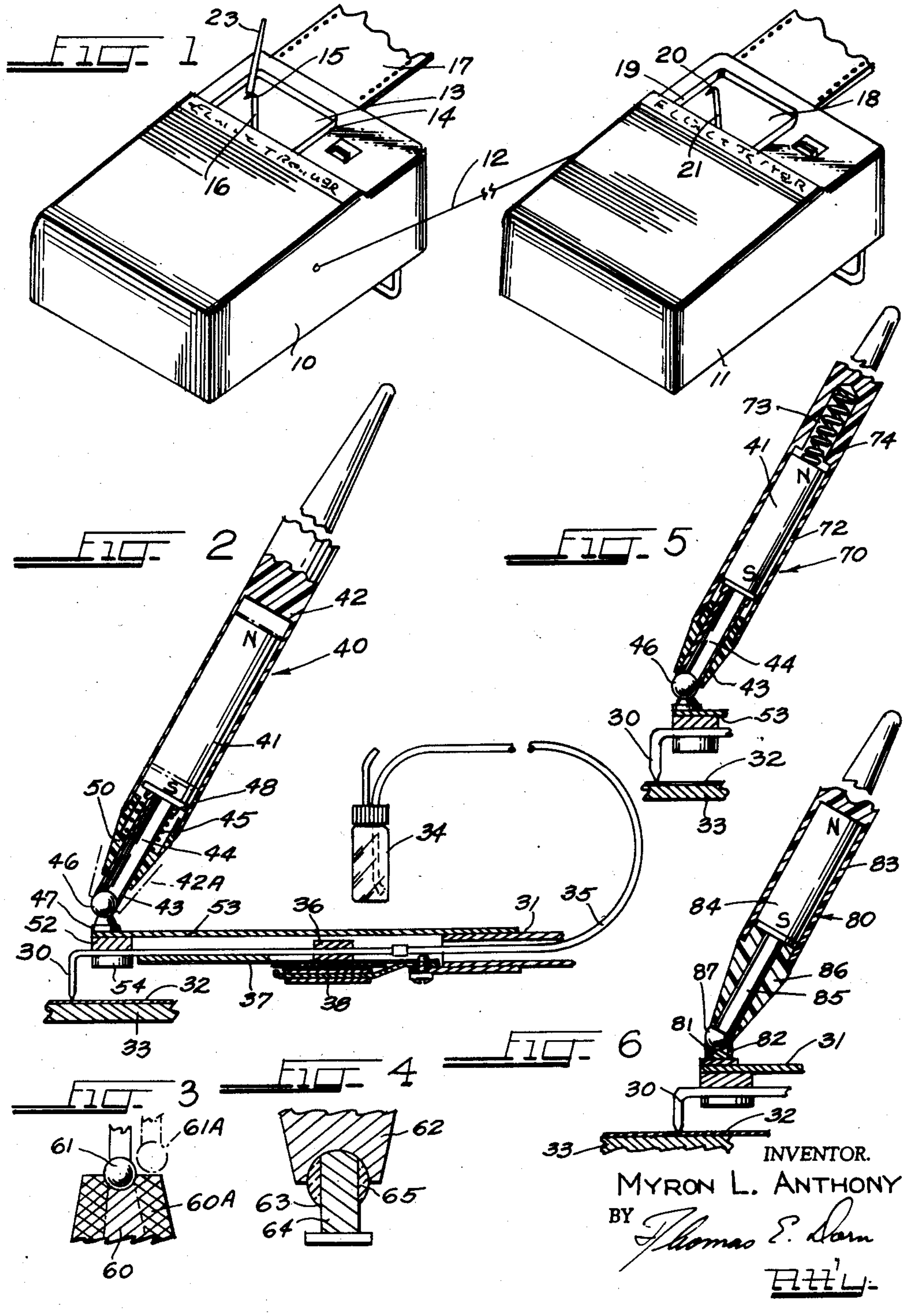
Fig. 1 is a simplified perspective view of an intelligence communication system in which the recording device of the invention may be employed.
Fig. 2 is an enlarged sectional view of a recording device constructed in accordance with one embodiment of the invention.
Fig. 3 is a simplified and enlarged illustration of a coupling system essentially similar to that of the recording device of Fig. 2 but with certain parts exaggerated in size for purposes of explanation.
Fig. 4 is a simplified drawing of another embodiment of the coupling system.
Fig. 5 is an enlarged sectional view of a modified recording device embodiment of the invention.
Fig. 6 is a sectional view of a substantially different recording device comprising another embodiment of the invention.

The tele-autographic communication system illustrated in Fig. 1 comprises two communication stations 10 and 11 which are electrically connected or otherwise coupled to each other as by a transmission line 12. It should be understood that a radio transmission link or other coupling arrangement may be substituted for the transmission line 12. The two stations 10 and 11 are both transceivers; that is, each station is adapted to operate as either a transmitter or a receiver.

The communication station 10 includes a writing surface 13 which is bounded by a frame 14; in operation, a suitable recording medium 17, usually paper, may be disposed upon the writing surface 13. The station 10 further includes a writing head or stylus 15 which is supported upon an arm or link 16 which constitutes a part of the transceiver apparatus. Preferably, the arm 16 comprises one member of a parallel linkage system in a translating apparatus of the kind described in the aforementioned Patent No. 2,583,535 of Robert Adler.

The communication station 11 is essentially similar in construction to station 10 and includes a writing surface 18 which is bounded by a frame 19. As in the case of station 10, the writing surface 18 may be utilized to support a suitable recording medium in position to be engaged by a writing head or stylus 20. The stylus 20 is mounted upon a support arm or link 21 which comprises one member of a translating mechanism similar to that utilized in station 10. The two communication units 10 and 11 each further include suitable electrical circuits for translating movements of the styli 15 and 20 into electrical control signals which may be transmitted over the line 12. In addition, each of the stations includes circuits and devices for moving the styli into and out of engagement with their associated writing surfaces and for moving the styli transversely of those surfaces to reproduce information thereon in response to the control signals transmitted over the line 12. These circuits and devices may be of known construction, particularly that described in the aforementioned Adler patents and therefore need not be set forth specifically herein.

To facilitate description of the operation of the intelligence communication system of Fig. 1, it may be assumed that station 10 is utilized as a transmitter and station 11 is employed as a receiver for a given communication. For this purpose, a stylus actuator 23 is engaged with the stylus 15 to afford a convenient means for manipulation of that stylus. With the actuator 23 is position, the transmitter operator is able to write a message or other data to be transmitted upon the recording medium supported upon writing surface 13. The consequent movements of the stylus 15 into and out of engagement with the writing surface 13 and across that surface are translated into electrical control signals by the mechanism and electrical circuits connected to link 16. These control signals are transmitted to station 11 and are utilized therein to drive the link 21 and cause the stylus 20 to transcribe the same message or data upon the recording medium supported upon writing surface 18.

When the recording media on writing surfaces 13 and 18 are filled, or when a further message or additional data are to be transmitted, the stylus 15 may be driven to a predetermined position on the writing surface 13. This particular movement of the stylus may be utilized to actuate a mechanism which changes the recording medium at both stations of the system; a paper feed control apparatus of this kind is described and claimed in Patent No. 2,621,249 to T. I. Ress, issued December 9, 1952, and assigned to the same assignee as the present invention. The two units 10 and 11 may also be reversed in operation, making unit 11 the transmitter and station 10 the receiver. For this purpose, the actuator 23 is removed from its engagement with the stylus 15 and a similar actuator is utilized to drive the stylus 20 of station 11. It may also be necessary to change certain of the electrical circuits and connections within the two stations of the communication system to condition them for the change in function; suitable switching apparatus may of course be provided for this purpose.

Fig. 2 illustrates a recording device which includes a coupling system constructed in accordance with the invention. The recording device shown therein comprises a stylus or pen member 30 which is supported upon a support link 31 for movement into and out of recording engagement with respect to a recording medium. The recording medium in this instance comprises a sheet of paper 32 supported upon a platen 33. The stylus member 30 comprises an inking device including a metal tube which is connected to an ink reservoir 34 by means of a flexible tube 35 to permit the recording of data on ordinary paper. Other types of marking pens or styli may also be utilized instead of the inking pen 30. For example, the stylus member of the recording device may comprise a heated marking stylus adapted to record data upon a heat-sensitive recording medium; a preferred stylus structure of this kind is described and claimed in the co-pending application of Myron L. Anthony, Ser. No. 676,264, filed August 5, 1957, and assigned to the same assignee as the present invention.

In the illustrated embodiment, the inking pen 30 is supported in a block 36 mounted upon a cantilever spring arm 37 which in turn is mounted on the support member 31. This suspension arrangement for the stylus member permits limited vertical movement of the pen with respect to the recording medium 32. Preferably, downward movement of the pen is limited by a stop member 38 which extends from the support arm 31 to a location immediately below the cantilever spring 37 but is spaced therefrom by a relatively small distance. Vertical movement in an upward direction is limited by a guide member 52 which is affixed to an upper extension portion 53 of the support link 31. The guide member 52 may also be provided with a slotted portion 54 to restrict lateral deflection of the pen with respect to the support link.

The recording device of Fig. 2 further includes an actuator member 40 which is employed to guide the movements of stylus member 30 across the recording medium 32 and also to move the stylus member into and out of contact with the recording medium. The actuator member 40 is preferably constructed with dimensions and configuration approximating those of a conventional fountain pen or other writing instrument to afford maximum facility in manual operation of the recording device. A permanent magnet 41 is mounted within the barrel 42 of the actuator, the mounting arrangement being such that the magnet may slide axially of the barrel. The magnet is polarized in a direction parallel to the axis of the actuator member, as indicated in the drawing by the north and south pole designations N and S. It should be understood that the polarization of the magnet may be reversed without in any way affecting operation of the invention.

The actuator member 40 further includes a sleeve-like insert 43 which is slidably mounted in the forward or tip end 50 of the barrel 42. A pole piece 44 is mounted within the sleeve 43 and extends from the magnet 41 toward the end of the actuator barrel. The sleeve 43 is fabricated from a non-magnetic material, preferably aluminum or other non-magnetic material. The ends of the sleeve 43 and the pole piece 44 opposite the magnet 41 form a concave contact surface which is preferably hemispherical in configuration. A biasing spring 45 may be mounted within the actuator barrel 42 in encompassing relation to the upper end of the sleeve 43. This biasing spring engages, at its opposite ends, a shoulder 48 on the sleeve and a shoulder on the lower portion 50 of the actuator barrel 42.

The recording device of Fig. 2 further includes a magnetic keeper element 46 which is mounted upon the extension portion 53 of the support arm 31. Preferably, the keeper element 46 is mounted immediately adjacent the end of the recording pen. The keeper element 46 comprises a ball of low-reluctance or "soft" magnetic material which is supported upon a pedestal 47. The term "soft" as applied to the keeper element 46 refers to the magnetic properties of this element rather than its physical hardness; preferably, the ball is relatively hard physically so that it is not overly subject to wear and erosion in operation. The magnetic keeper 46 has a radius of curvature equal to the radius of the concave contact surface afforded by the sleeve 43 and the pole piece 44 of the actuator member. In operation, as explained more fully hereinafter, the keeper element engages in the concavity on the actuator and is magnetically linked to the magnet 41 by the pole piece 44.

Operation of the recording device of Fig. 2 is extremely simple insofar as manipulation and use by an operator in the communication system (Fig. 1) is concerned. When the stylus member 30 is to be utilized as the control stylus at a communication station functioning as a transmitter, the actuator member 40 is brought into engagement with the keeper element 46, the keeper being seated in the concavity at the tip end of the actuator. The spring 45 acting against the sleeve shoulder 48 and the tip 50 of the actuator biases the magnet, sleeve, and pole piece elements of the actuator inwardly of the barrel, positioning the barrel as indicated by phantom outline 42A. The magnetic flux linking the magnet 41, the pole piece 44, and the keeper 46 maintains the actuator member in engagement with the keeper and permits limited upward movement of the actuator barrel with respect to these members without detaching the actuator from the stylus support arm. Thus, the normal lifting motions entailed in writing or other recording movements of the actuator 40 allow limited movement of the actuator without decoupling the actuator from the pen 30; the spring 45 restores the actuator to its normal operating position whenever the upwardly acting force is released. Accordingly, data may be recorded continuously in a normal manner without disturbing the engagement of the actuator member 40 and the keeper element 46. Relatively strong upward or lateral pull of the actuator, on the other hand, quickly frees the actuator from the keeper element, thereby preventing damage to the support arm 31 or the mechanisms to which that support arm may be connected as set forth hereinabove in connection with the description of Fig. 1. The stylus actuator 40 may be rotated to virtually any desired angular position with respect to the pen and its support arm without detaching the actuator from the keeper; consequently, the coupling system linking the actuator and the keeper permits control of the stylus in a manner essentially similar to writing with an ordinary pen.

The coupling system employed in the recording device illustrated in Fig. 2 is particularly advantageous in that it allows only one type of movement between the two coupled members, the actuator member 40 and the stylus member 30, this being the above-described rotational or angular displacement of the two members with respect to each other. This may perhaps best be understood by reference to Fig. 3, which shows a similar coupling arrangement in which certain portions have been exaggerated to facilitate explanation of the phenomenon involved. The coupling system illustrated in Fig. 3 comprises a pair of magnetic members 60 and 61; the member 60 is provided with a hemispherical concavity in which a spherically-shaped portion of the member 61 is seated. Assuming that a magnet or electromagnet is connected to one of these two members, it will be seen that they are magnetically linked to each other in much the same manner as in the coupling system employed in the recording device of Fig. 2.

If each of the magnetic coupling members 60 and 61 is formed entirely of a magnetically "soft" or low-reluctance material, the desired restriction to one degree of relative movement between the two members is not achieved. Rather, the member 61 may be displaced, for example, to an alternate position as indicated by the dash outline 61A without materially disturbing the coupling between the two members. It is thus seen that, under these circumstances, the coupling system has two degrees of freedom, including lateral displacement as well as rotational movement. This may be highly undesirable in a recording device such as that of Fig. 2 and in similar applications; in the illustrated recording device, for example, such lateral displacement would interfere considerably with accurate reproduction of data since the actuator 40 would tend to slip from the desired alignment with respect to the keeper member 46.

This condition of dual freedom of movement may be corrected by changing the construction of either of the members 60 and 61. In the coupling system shown in Fig. 3, this is accomplished by fabricating the peripheral portion 60A of the member 60 from a non-magnetic material. With this modification of the initial structure, any lateral displacement of the two members with respect to each other effectively introduces an air gap between the two principal elements of the magnetic system. A substantially larger force is required to accomplish this than to effect the same movement where both members are constructed entirely from a low reluctance material. Stated differently, the fabrication of the peripheral portion 60A of the member 60 from a non-magnetic material results in a coupling system which has a strong preference for the desired centered coupling relationship of the two members of the system and which effectively resists translation of the member 61 to the alternate position 61A or any other similar misaligned position. There is one, and only one, preferred alignment for the two elements of the coupling system.

Fig. 4 illustrates another embodiment of the basic coupling system which may be utilized in a recording device such as that of Fig. 2 and in similar applications requiring a universal-type coupling which normally permits only rotational movement of the coupled members of the system yet which permits separation of the coupled members upon exertion of a given separating force. In this embodiment, a first coupled member 62 is provided with a substantially hemispherical concavity for receiving a second member 63. The central portion 64 of the member 63 is formed from a magnetic material of low reluctance and may therefore be magnetically coupled to the member 62. A peripheral portion 65 of the member 63, however, is formed from a non-magnetic material such as a non-magnetic metal or any other suitable material, including glass, plastics, and the like. With this arrangement, as before, rotational movement of the two members is simply and readily accomplished with a minimum of externally applied force. Lateral displacement of the two couplied members, or direct separation thereof, requires a substantially larger force, since movement of this kind immediately tends to introduce an air gap into the magnetic system and is resisted by the flux linkage between the two members. In this respect, the coupling system of Fig. 4 functions in essentially the same manner as that of Fig. 3. In most instances, the construction illustrated in Fig. 3 is somewhat simpler and more economical in fabrication, but in other respects the two constructions are substantially equivalent.

Fig. 5 shows a recording device which in most respects is substantially similar to that of Fig. 2. As before, the recording device comprises a stylus member 30 which is supported for movement into and out of recording position with respect to the paper or other recording medium 32 on the platen 33. Moreover, the keeper element 46 in this embodiment is essentially similar to the keeper of Fig. 2 and is mounted in fixed position with respect to the pen 30.

The actuator member 70 of Fig. 5, like the actuator 40 of Fig. 2, comprises a magnet 41 which is slidably mounted within the barrel 72 of the actuator member and which is magnetically linked to the keeper element 46 by the pole piece 44. The pole piece 44 is encased in a non-magnetic sleeve 43 and the ends of the pole piece and sleeve opposite the magnet 41 define a concavity for seating the keeper element 46. The actuator member 70, however, includes a substantially different biasing arrangement than that incorporated in the previously described actuator member 40. A biasing spring 73 is mounted within the upper portion 74 of the actuator barrel 72, the opposite ends of the biasing spring being engaged with the magnet 41 and the barrel portion 74 respectively. Spring 73 is preferably fabricated from a highly compliant resilient material and should be somewhat more compliant than the support arm for the stylus 30.

Operation of the recording device illustrated in Fig. 5 is substantially similar to that of Fig. 2 except for the variation introduced by the different biasing arrangements employed in the two devices. The spring 73 tends to maintain the slidable elements of the actuator, including the magnet 41, the sleeve 43, and the pole piece 44, in extended position with respect to the actuator barrel 72. When the communication system operator wishes to utilize the actuator member to control operation of the stylus 30, he may engage the stylus actuator with the keeper element 46 as illustrated in Fig. 5, the keeper element being seated in the concavity defined by the pole piece 44 and the sleeve 43. In writing or similar recording operations, the actuator barrel 72 is pressed downwardly to the position shown in Fig. 5 against the relatively light bias afforded by the spring 73 and the stylus actuator is utilized to guide movements of the pen across the recording medium 32 in a manner essentially similar to normal writing. The biasing spring affords a certain degree of vertical compliance in the actuator itself without affecting the essential nature of the coupling system, which permits only rotational movement between the coupled members comprising the pole piece and sleeve and the keeper element. When it is desired to remove the actuator member 70, as when the recording device is to be converted to receiver operation, the actuator member 70 is simply pulled away from the keeper 46. The force necessary to separate the actuator from the keeper is of course determined by the strength of the permanent magnet 41 and by the amount of magnetic material in the keeper member 46. This force may be made relatively low, particularly since the small soft iron keeper element 46 saturates with even a relatively weak magnet. Thus, the coupling system of the embodiment of Fig. 5 affords substantially similar operating characteristics to those of Figs. 2; it limits the coupling between the actuator member and stylus member to one degree of movement for normal operation yet permits breaking of the coupling between the two members by exertion of a force much too small to afford any possibility that the stylus member or its associated linkage will be damaged.

Fig. 6 illustrates another embodiment of the invention, comprising a recording stylus 30 supported upon a link or arm 31 for movement into and out of recording position with respect to a sheet of paper 32 supported upon a platen 33. The recording device of this embodiment further includes an actuator member 80 which is utilized to move the recording stylus 30 transversely of the recording medium 32 and into and out of contact therewith.

In this instance, however, there is no spherical magnetic keeper element mounted at the end of the stylus support arm. Rather, the keeper in this instance comprises a soft iron element 81 which is mounted upon the support arm 31 and which has a substantially concave upper surface, preferably of generally hemispherical configuration. The keeper element 81 is circumscribed by a ring 82 of non-magnetic material having an upper surface which comprises a continuation of the concave upper surface of the keeper element 81. Thus, these two elements afford a concave contact surface having a magnetic central portion and a non-magnetic peripheral portion substantially similar to that described in detail hereinabove in connection with Fig. 3.

The stylus actuator 80 in the embodiment of Fig. 6, like those of the previously described embodiments, conforms in size and general configuration to a conventional fountain pen or similar writing instrument. The actuator comprises a barrel portion 83 formed from a plastic or other suitable non-magnetic material and having a permanent magnet 84 mounted therein. In this instance, the magnet is disposed in fixed position within the actuator barrel, although either of the biasing arrangements may be utilized in connection with a slidably mounted magnet if desired. A pole piece 85 is supported within the end portion 86 of the actuator barrel, one end of the pole piece being disposed in contact with one pole of the permanent magnet 84. The end 87 of the pole piece 85 opposite the magnet 84 is of convex configuration, permitting engagement of the pole piece in the concavity defined by the keeper element 81 and the non-magnetic ring 82. Preferably, the pole piece tip 87 is of hemispherical configuration with a radius of curvature approximately equal to that of the concavity of the keeper element.

Operation of the embodiment of Fig. 6 is essentially similar to that of the previously described constructions. The actuator member 80 may be moved to virtually any desired angular position with respect to the keeper element 81 without releasing the actuator from engagement with the keeper. Accordingly, writing, drawing, and other operations may effectively be accomplished without requiring frequent detachment and re-engagement of the actuator with the stylus. The relatively small upward lifting or pulling forces applied to the actuator in the course of normal writing and drawing procedures do not detach the actuator 80 from the keeper 81; on the other hand, an upward pull of substantial magnitude immediately detaches the actuator from the keeper and prevents damage to the stylus or to its support arm 31.

Each of the above-described embodiments of the invention is extremely simple and economical in construction as compared with mechanical latching devices and other known arrangements. The coupling system of the invention affords positive protection for the delicate linkage employed in recording devices and like apparatus, yet provides adequate coupling for normal writing, drawing, and other similar operation. In each instance, the coupling system restricts relative movement of the two coupled members to rotational displacement and prevents any relative motion of translation therebetween It will of course be recognized that the magnet need not be disposed within any particular one of the coupled members, although, in a recording device such as it is illustrated in Figs. 2, 5 and 6 it is desirable that the magnet be mounted within the actuator member in order to keep the weight of the stylus structure at a minimum. It is quite possible, however, to utilize a keeper member on the actuator and to afford a permanent magnet as a part of the stylus structure. For example, in the embodiment of Fig. 2, the element 46 may comprise a permanent magnet of spherical configuration, in which case the magnet 41 is not required for the coupling system, or a separate magnet may be mounted on the stylus support arm and magnetically linked to the keeper. The coupling system is of particular advantage in recording devices of the kind described because no particular skill is required to install the actuator member in operative relation to the stylus in any of the many possible embodiments, thereby avoiding any necessity for special training of personnel with regard to this aspect of the recording operation.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A recording device comprising: a stylus member supported for movement into and out of recording position with respect to a recording medium to record data thereon; a stylus actuator member for guiding the movements of said stylus; a magnetic pole piece element mounted on one of said members; a magnetic keeper element mounted on the other of said stylus and actuator members, one of said pole piece and keeper elements having a convex contact surface and the other element having a concave contact surface for receiving said convex surface of said first member; means for establishing an open magnetic circuit including a magnetic flux field linking said elements to releasably mount said actuator member on said stylus member; and means for limiting said elements to angular movement relative to each other comprising a non-magnetic element of generally annular configuration disposed in circumscribing relation to one of said elements and affording a peripheral continuation of the contact surface of that element having substantially the same configuration as said contact surface.

2. A recording device comprising: a stylus member supported for movement into and out of recording position with respect to a recording medium to record data thereon; a stylus actuator member for guiding the movements of said stylus; a permanent magnet mounted on one of said members; a magnetic pole piece element mounted on said one member in engagement with said magnet; a magnetic keeper element mounted on the other of said stylus and actuator members, one of said pole piece and keeper elements having a convex contact surface and the other element having a concave contact surface for receiving said convex surface of said first member to form an open magnetic circuit linking said keeper element and said pole piece element and releasably mounting said actuator member on said stylus member; and means for limiting said elements to angular movement relative to each other comprising a non-magnetic element of generally annular configuration disposed in circumscribing relation to one of said elements and affording a peripheral continuation of the contact surface of that element having substantially the same configuration as said contact surface.

3. A recording device comprising: a stylus member supported for movement into and out of recording position with respect to a recording medium to record data thereon; a stylus actuator member for guiding the movements of said stylus; a permanent magnet slidably mounted within said actuator member; a magnetic pole piece element slidably mounted within said actuator member in engagement with said magnet; resilient biasing means urging said magnet and said pole piece element toward a predetermined position with respect to said actuator; a magnetic keeper element mounted on said stylus member, one of said pole piece and keeper elements having a convex contact surface and the other element having a concave contact surface for receiving said convex surface of said first member to releasably mount said actuator member on said stylus member; and means for limiting said elements to rotational movement relative to each other comprising a non-magnetic element of generally annular configuration disposed in circumscribing relation to one of said elements and affording a peripheral continuation of the contact surface of that element having substantially the same configuration as that contact surface.

4. A recording device comprising: a stylus member supported for movement into and out of recording position with respect to a recording medium to record data thereon; a stylus actuator member for guiding the movements of said stylus; a permanent magnet mounted on said actuator member; a magnetic pole piece element mounted on said actuator member in engagement with said magnet; a non-magnetic sleeve disposed in encompassing relation to said pole piece element and defining therewith a hemispherical concave contact surface comprising a central area of magnetic material circumscribed by a peripheral area of non-magnetic material; and a magnetic substantially spherical keeper element mounted on said stylus member, said keeper element, said magnet, and said pole piece element forming an open magnetic circuit, said keeper element having a radius of curvature approximately equal to the radius of said concave contact surface for releasably mounting said stylus actuator member on said stylus member.

5. A recording device comprising: a stylus member supported for movement into and out of recording position with respect to a recording medium to record data thereon; a stylus actuator member for guiding the movements of said stylus; a magnetic pole piece element mounted on one of said members; a magnetic keeper element mounted on the other of said stylus and actuator members, one of said pole piece and keeper elements having a substantially spherical convex contact surface and the other element having a substantially hemispherical concave contact surface for receiving said convex surface of said first member, said surfaces having substantially equal radii; means for establishing an open magnetic circuit including a magnetic flux field linking said elements to releasably mount said actuator member on said stylus member; and means for limiting said elements to rotational movement relative to each other comprising a non-magnetic element of generally annular configuration disposed in circumscribing relation to one of said elements and affording a peripheral continuation of the contact surface of that element having substantially the same configuration as that cotnact surface.

6. A recording device comprising: a stylus supported for movement into and out of recording position with respect to a recording medium and movable transversely of the recording medium to record data thereon; a stylus actuator for guiding the movements of said stylus; a permanent magnet mounted within said stylus actuator; a magnetic pole piece member mounted on said actuator in engagement with said magnet; a magnetic keeper member mounted in fixed position with respect to said stylus, one of said members having a convex surface for engaging a concave contact surface on the other member said keeper member forming an open magnetic circuit with said permanent magnet and said pole piece member, the effective magnetic engagement area of said concave contact surface being smaller than the area of said convex surface; and non-mangetic means on said other member disposed in encompassing relation to said contact surface and having substantially the same configuration as that contact surface to define therewith a concavity for receiving said first member and to limit said members to angular movement relative to each other.

References Cited in the file of this patent

UNITED STATES PATENTS

| | | |
|---|---|---|
| 745,692 | Tiffany | Dec. 1, 1903 |
| 2,510,634 | Hull | June 6, 1950 |
| 2,561,923 | Harmon | July 24, 1951 |
| 2,676,869 | Ress | Apr. 27, 1954 |